United States Patent [19]
Allen

[11] 3,817,111
[45] June 18, 1974

[54] LOCK AND TRAVERSE FINE FEED MECHANISM AND BEARING ARRANGEMENT FOR A MEASURING MACHINE CARRIAGE

[75] Inventor: Paul E. Allen, Springfield, Ohio

[73] Assignee: The Bendix Corporation, Southfield, Mich.

[22] Filed: Nov. 2, 1972

[21] Appl. No.: 303,674

Related U.S. Application Data

[62] Division of Ser. No. 119,700, March 1, 1971.

[52] U.S. Cl. .................................. 74/156, 188/67
[51] Int. Cl. ............................................ F16h 51/00
[58] Field of Search .............. 74/156, 125.5; 188/67

[56] References Cited
UNITED STATES PATENTS

| | | | |
|---|---|---|---|
| 255,084 | 3/1882 | Nicholson | 74/156 |
| 428,812 | 5/1890 | Johanson | 188/67 |
| 2,512,150 | 6/1950 | Geren | 188/67 |
| 2,637,113 | 5/1953 | Kreenlein | 188/67 |
| 3,403,448 | 10/1968 | Aller | 33/174 L |

Primary Examiner—Samuel Scott
Assistant Examiner—Wesley S. Ratliff, Jr.
Attorney, Agent, or Firm—John R. Benefiel

[57] ABSTRACT

A measuring machine having a simplified manually operated carriage locking and fine feed traversing mechanism comprised of a double lever gripper linkage mounted on the carriage with a brake bar and threaded adjustment rod rotatably carried by the carriage mounting structure and successively operable to lock the carriage and adjust the position of the carriage on the mounting structure against a frictional engagement of the brake bar and gripper linkage. The bearing arrangement includes a pair of spool bearings mounted on the Y-axis carriage and riding on an upper way with a lower spherical bearing mounted on the carriage with its axis extending normally to the spool bearings and riding on a lower way adjustably secured to the carriage mounting structure, so that the extent of probe overhang and the way machining costs may be minimized.

3 Claims, 10 Drawing Figures

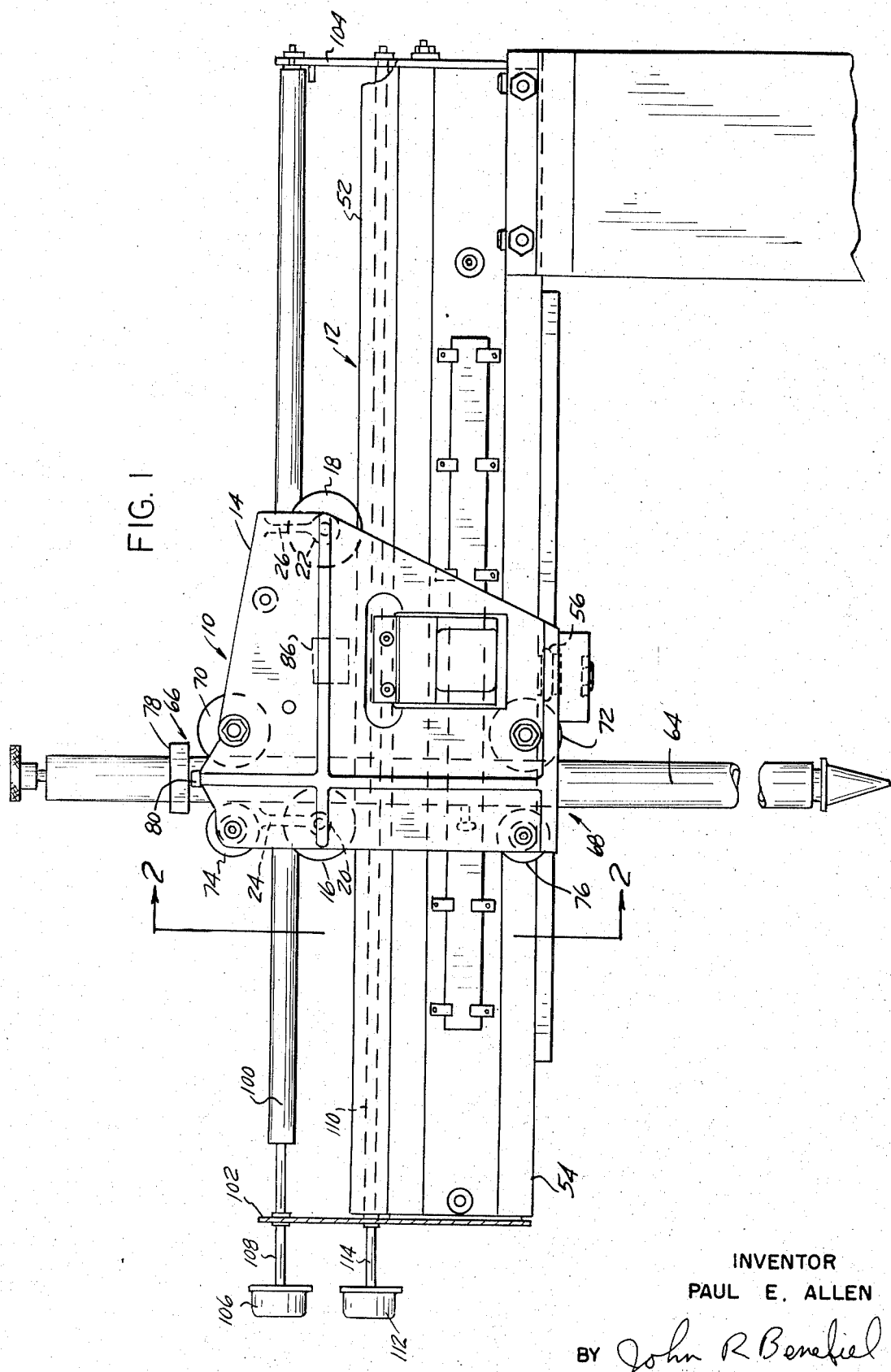

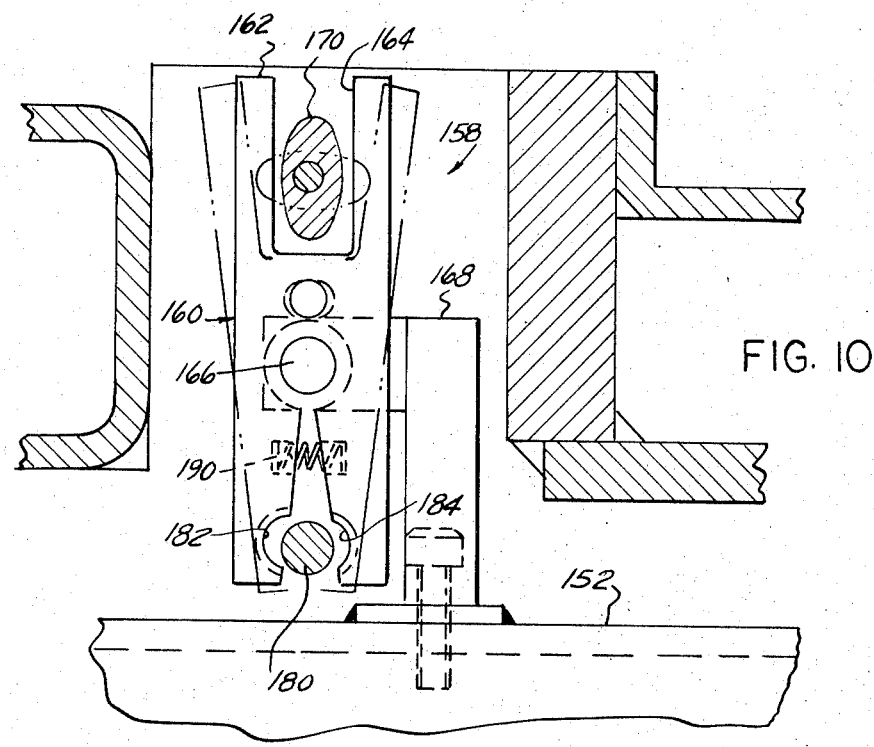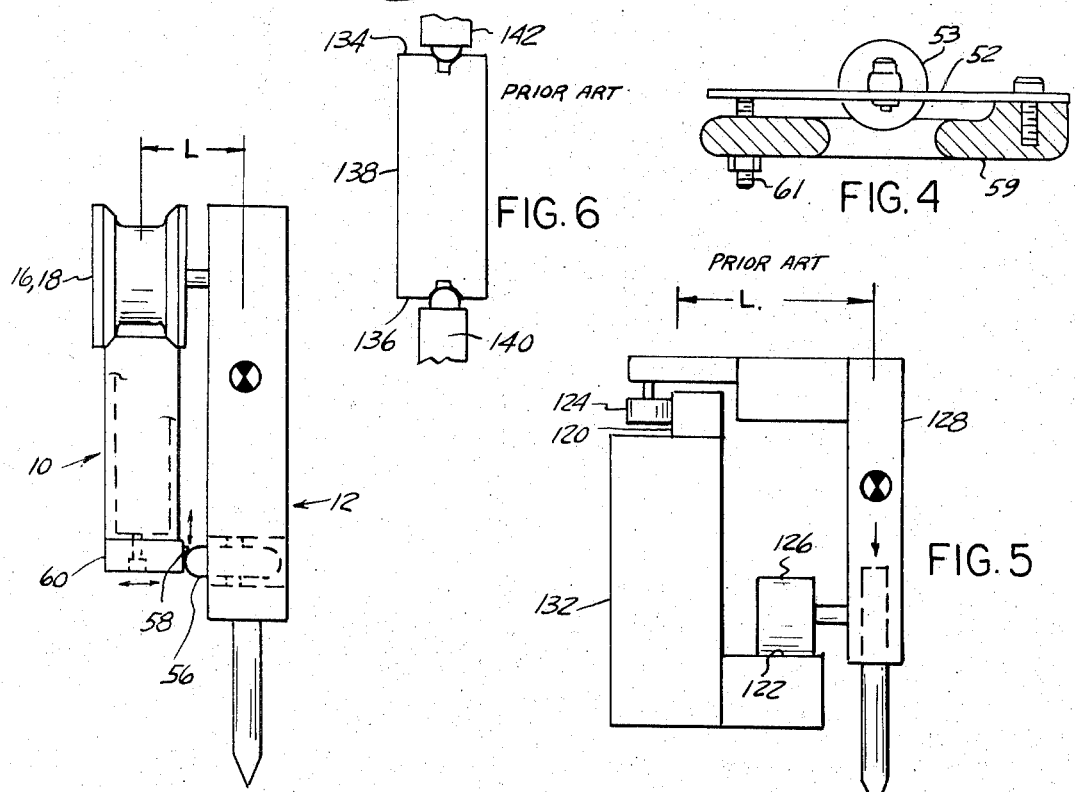

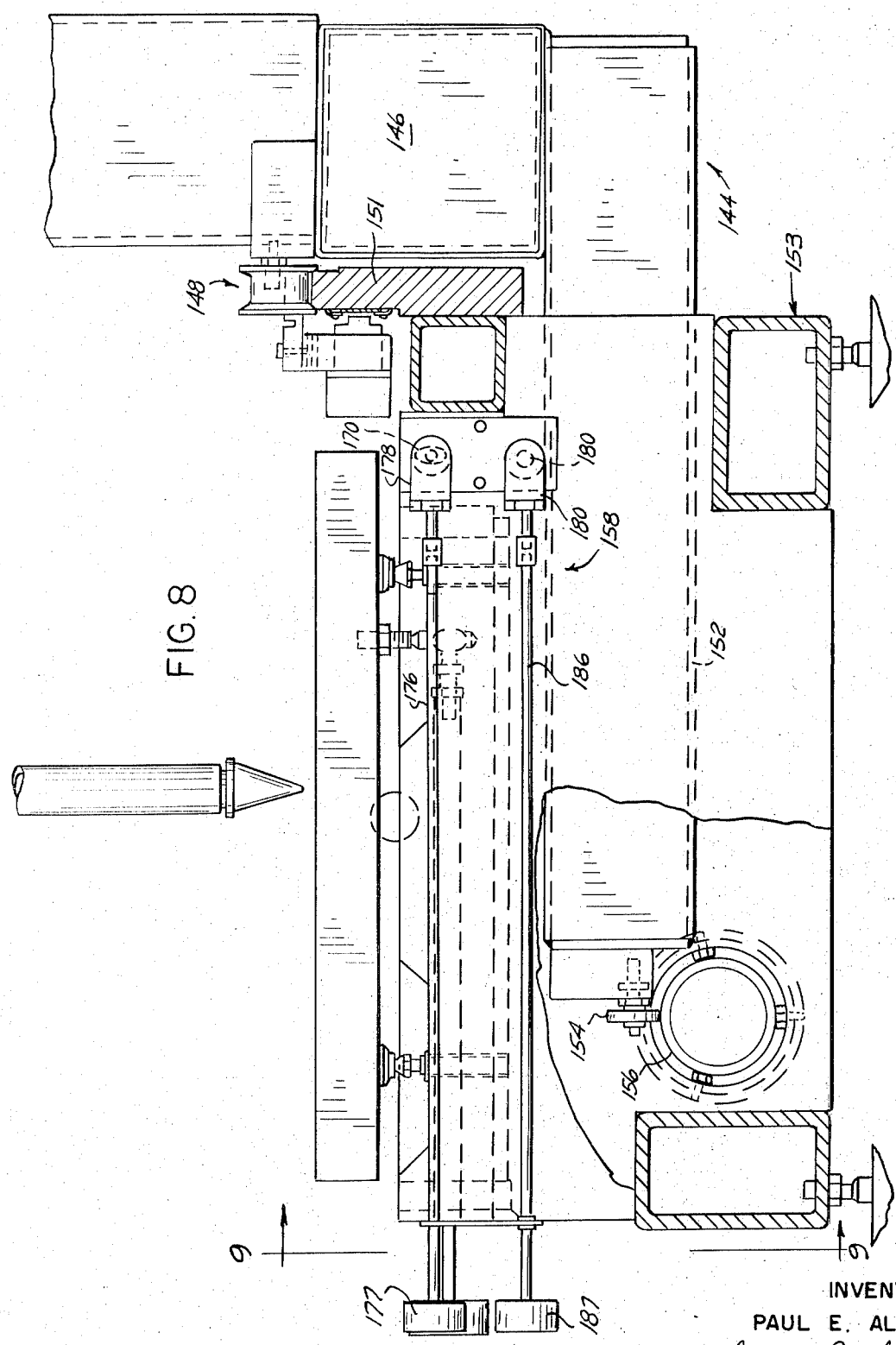

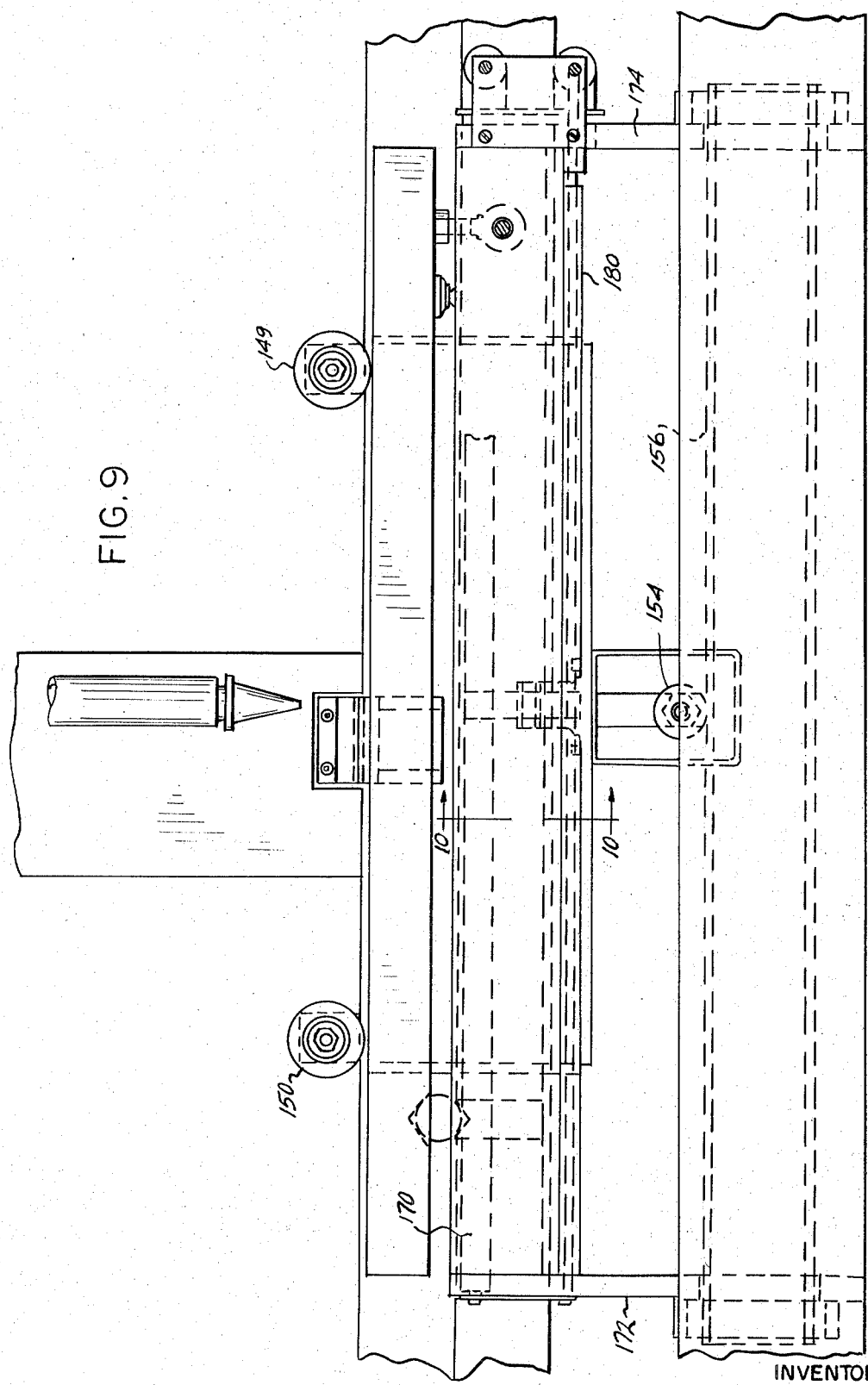

LOCK AND TRAVERSE FINE FEED MECHANISM AND BEARING ARRANGEMENT FOR A MEASURING MACHINE CARRIAGE

This is a division of application Ser. No. 119,700, filed Mar. 1, 1971.

BACKGROUND OF THE INVENTION

1. Field of the Invention

This invention concerns measuring machines of the type having a measuring probe supported for movement along the X and Y axes by means of carriages mounted one on the other and both on a machine base for rolling movement along these axes, and more specifically is concerned with a lock and traverse fine feed mechanism for such carriages and a bearing arrangement for the carriage which directly supports the probe.

2. Description of the Prior Art

Measuring machines of the type referred to and described in U.S. Pat. No. 3,403,448 have proved to be of great utility in many manufacturing and other operations due to the great labor and time savings in obtaining precision measurements of parts gained by the use of these machines. However, these machines are relatively expensive, and if the cost thereof could be reduced a much wider useage of these machines would be possible. Since the precision way bearing arrangements contribute heavily to the costs of these machines, substantial cost savings could be effected if the machining and other costs thereof could be reduced. In copending application Ser. No. 119,781, filed Mar. 3, 1971, now U.S. Pat. No. 3,774,311 a spool bearing arrangement is disclosed which contributes to this end, while a way arrangement for the carriage which directly supports the probe utilizing such spool bearings is disclosed herein to further reduce the way machining costs.

Similarly, if the lock and fine feed traverse mechanism for both carriages could be simplified without a substantially detrimental effect on the performance thereof, still further cost savings could be effected.

Therefore, it is an object of the present invention to provide a low cost precision way arrangement for such a machine carriage.

It is a further object to provide a simplified lock and fine feed traverse mechanism for either of such carriages.

SUMMARY OF THE INVENTION

These objects and others which will become apparent upon a reading of the following specification and claims is accomplished by a way arrangement for the carriage which directly supports the probe in which a pair of spool bearings rotatably mounted on the carriage ride upon horizontally extending upper way, while a spherical bearing also rotatably mounted to the carriage, but with its axis extending transversely to the spool bearing axes, and running on an adjustable vertically disposed way surface.

The lock and fine feed traverse mechanism includes a double lever gripper linkage mounted on the carriage and a brake bar and threaded adjustment rod both rotatably mounted on the carriage mounting structure. Successive manipulation of these elements causes frictional locking of the carriage to the mounting structure and fine feed traversing against the frictional lock.

BRIEF DESCRIPTION OF THE DRAWINGS

FIG. 1 is a side elevational view of a Y-axis carriage and mounting structure of a measuring machine of the type described.

FIG. 4 is a view of the section taken along the line 4—4 in FIG. 2.

FIG. 5 is a diagrammatic representation of a prior art way bearing arrangement.

FIG. 6 is a diagrammatic representation of another prior art way bearing arrangement.

FIG. 7 is a diagrammatic representation of the way bearing arrangement according to the present invention.

FIG. 8 is a side elevational view in partial section of an X-axis carriage and mounting structure of a measuring machine of the type described utilizing a lock and traverse fine feed mechanism according to the present invention.

FIG. 9 is a front elevational view of an X-axis carriage and mounting structure of a measuring machine of the type described utilizing a lock and traverse find feed mechanism according to the present invention.

FIG. 10 is a view of the section taken along the line 10—10 in FIG. 9.

DETAILED DESCRIPTION

In the following detailed description certain specific terminology will be employed for the sake of clarity and a specified embodiment and environment will be described in order to provide a full and complete understanding of the invention, but it is to be understood that the invention may be practiced in a variety of forms, embodiments, and environments.

Figure 2:
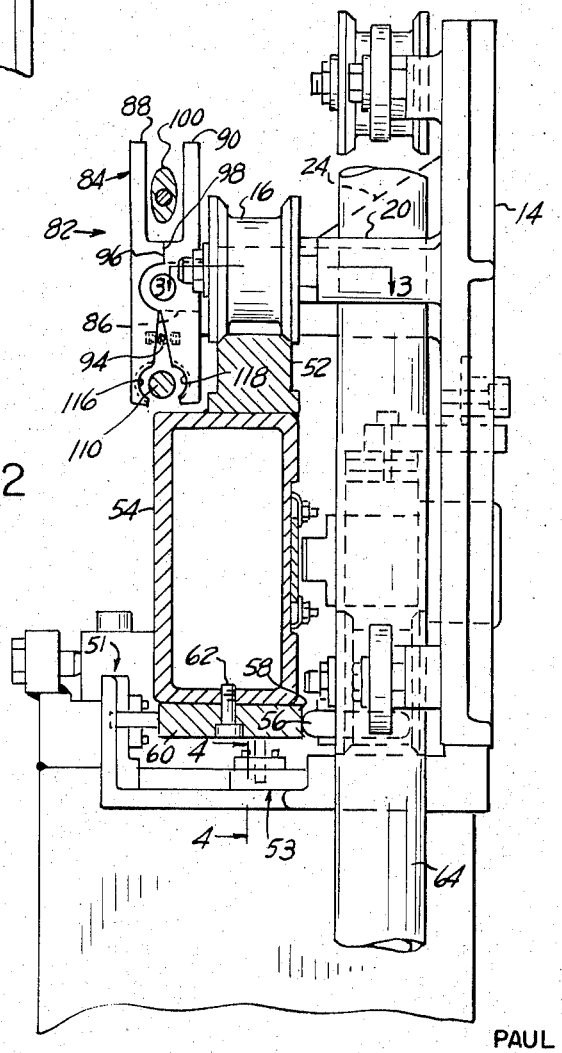
FIG. 2 is a view of a section taken along the line 2—2 in FIG. 1.

Referring to the drawings, and particularly FIGS. 1 and 2, a Y-axis carriage 10 and as associated mounting structure 12 are depicted. The carriage 10 is referred to herein as the Y-axis carriage since in this embodiment it moves normal to the front of the machine, but the bearing arrangement disclosed herein is useful on the carriage which directly supports the probe and hence is useable on the carriage which provides this function regardless of designation as the X and Y.

The Y-axis carriage 10 includes a plate member 14 which supports a pair of spool bearings 16 and 18 by means of a pair of mounting posts 20 and 22 integral with the plate member 14 and reinforced with gussets 24 and 26, respectively.

Figure 3:
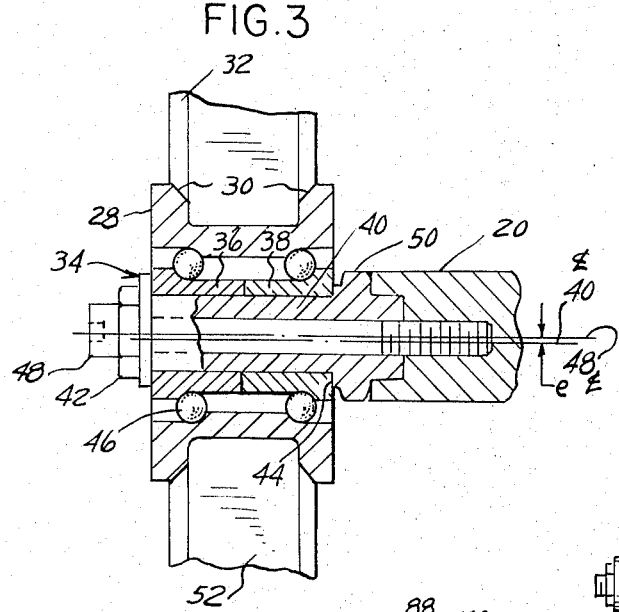
FIG. 3 is a view of a section taken along the line 3—3 in FIG. 2.

The details of the spool bearings 16 and 18 are shown in FIG. 3, and include an outer race 28 having inwardly sloping bearing surfaces 30 contoured to cooperate with the outwardly directed convex way surfaces 32 so as to provide guidance in both the vertical and horizontal planes. The inner race 34 is comprised of a pair of sleeves 36 and 38 to allow preloading of the bearing by axial compression on a hub member 40 via a nut 42 threaded on one end of the hub member 40 and an abutment 44 on the other end. By properly selecting the axial length of the sleeves 36 and 38 and the undersized annulus between the inner and outer races 28 and 34, a compressional preload of the balls 46 disposed therein which will eliminate and radial play will be obtained when the sleeves 36 and 38 are forced into abutting contact with each other.

An adjustment is also provided by eccentrically mounting the hub member 40 on a cap screw 48 threaded into mounting post 20. Thus by loosening the cap screw 48 and rotating the hub member via drive surfaces 50, the eccentricity will create a shift in position of the center of rotation of the bearing 16. The advantages of this form of bearing in this context are described in some detail in the above-identified copending application.

The spool bearings 16 and 18 are disposed to roll on a way 52 into which the convex surfaces 32 are ground, while the way 52 is fastened as by welding to a box beam 54 which constitutes the carriage mounting structure.

The carriage 12 also includes a spherical bearing 56 rotatably mounted to the carriage 12 on an axis extending normal to the axes of the spool bearings 16 and 18. The spherical bearing 56 is disposed to roll on vertically positioned way surface 58 on lower way 60, secured to the box beam 54 by means of cap screw 62.

The lower way 60 may be positioned at assembly by shifting its position before fully tightening the cap screws 62 so that the probe 64 will run true vertical throughout its travel along the Y-axis.

Further, since the bearing runs on a spherical surface, this allows for some angular derivation from true normal between the spherical bearing 56 and the way surface 58.

A detailed discussion of the advantages of this arrangement as contrasted with the prior art is given below.

In order to insure that the spool bearings 16 and 18 and spherical bearing 56 remain firmly in contact with the upper and lower races 52 and 56, respectively, a pair of spring loaded rollers 52 and 53 are provided carried by a bracket 55 secured to plate 14. The section in FIG. 4 shows the mounting details of roller 53 which is typical. The roller 53 is rotatably mounted on a leaf spring 57, fastened to mounting plate 59 which is in turn fastened to bracket 55. By adjusting the screw 61, the relative spring force exerted on the roller and position for a given installation may be adjusted, so that throughout the carriage 12 travel, a force is maintained on the carriage to insure against lifting off of any bearing from its way.

The probe 64 which may be constructed according to that shown in the above referenced patent, is also supported for vertical travel on the carriage 10 between sets of rollers 66 and 68, each set comprised of a spool bearing 70, 72 and a plain roller bearing 74, 76. The downward limit of travel is controlled by a collar 78 and cap screw 80. A counterweight arrangement (not shown) may be utilized to render vertical or Z axis manipulations more convenient if desired.

In order to simplify the mechanism as described, the carriage 10 is contemplated as being manually traversed into a roughly accurate position with the lock and traverse fine feed mechanism 82 according to the present invention then utilized to accurately fix the position of the carriage at the desired location.

This mechanism 82 includes a double lever gripper linkage 84, pivotally mounted to mounting block 86 integral with the plate 14. The gripper linkage 84 consists of a pair of levers 88 and 90 pinned at 92 so that spreading of the upper ends of the individual levers 88 and 90 causes a movement of the lower ends thereof towards each other and vice versa. A bias spring 94 is provided to bias the levers into the position shown with abuts 96, 98 in contact.

Disposed between the upper ends of the lever 88 and 90 is an oblong in section brake bar 100, which is rotatably supported on the mounting structure 12 by means of end plates 102 and 104 fastened thereto. This function may also be fulfilled by the machine cover structure (not shown). A control knob 106 fastened to central rod 108 serves to provide manual rotation of the brake bar 100.

Disposed between the lower ends of the levers 88 and 90 is a threaded adjustment rod 110 likewise supported for rotation in end plates 102 and 104 and similarly a control rod 112 and connector rod 114 serve to provide manual rotation thereof.

Formed in the lower ends of levers 88 and 90 are semicircular cutouts 116 and 118 having internal threads formed therein complementary to those formed in the adjustment rod 110.

Thus upon rotation of control knob 106 and brake bar 100, the upper ends of the levers are spread apart causing the lower ends to close together against the bias of spring to grip the threaded adjustment rod 110. In this position, the brake bar is disposed with its long axis horizontal (see the phantom lines in FIG. 10), and frictionally engaged with the lever upper ends and retained in this position by this frictional engagement. Thus a connection is established between the carriage 12 and the mounting structure 10 to effectively brake the carriage against relative movement.

Since the internal threads of the cutouts 116 and 118 are engaged with the adjustment rod 110 in this position, rotation of knob 112 will cause fine feed movement of the carriage 10 against the frictional braking engagement of the brake bar 100. Since this involves slippage between the brake bar 100 and the upper ends of levers 88 and 90, these levers are preferably constructed of brass to insure maximum smoothness of travel.

This frictional braking insures elimination of backlash error due to play in the adjusting threads and associated linkage, firmly positioning the carriage in every selected position.

Referring to FIGS. 5, 6, and 7, the advantages of the above-described bearing arrangement with respect to the prior art can be appreciated more readily.

In FIG. 5, one prior art arrangement is depicted in which an upper way 120 and a lower way 122 having ball bearings 124 and 126 disposed therein are used to support the carriage 128. However, this arrangement tends to create an excessive carriage overhang L due to the presence of the "shelf" created by the way 130. This overhang causes a relatively large torque to be applied to the carriage mounting structure 132 necessitating the use of a relatively heavy structure 132 to prevent excessive deflections thereof.

In FIG. 6, another prior art arrangement in which the V-grooves are formed in upper and lower edges 134, 136 of the mounting structure 138.

This solves the problem of the overhang, but creates a severe machining problem as the upper and lower V-grooves must be ground absolutely parallel to each other, as no adjustment is possible. Further, the spacing of the grooves between each other must be held in machining since no accommodation for movement between the bearings 140 and 142 is possible.

FIG. 7 shows the arrangement according to the present invention. It can be seen that elimination of the shelf is accomplished by the use of a vertically disposed lower way surface and thus the overhang L is minimized allowing use of a less bulk mounting structure 10. Furthermore, inexpensive to machine way surfaces are utilized since the upper surfaces are external partial cylinders, the lower surface is simply ground flat, and the upper and lower ways need not be machined closely parallel to each other since the lower way 60 may be adjusted to provide vertical position of the carriage 12 throughout its travel. In addition, the way spacing is not critical since the spherical bearing 56 may travel up and down freely to accommodate any variations in such spacing.

For this reason, this bearing arrangement yields a low cost construction without sacrificing precision travel of the carriage 12 and supported probe 64.

FIGS. 8, 9, and 10 illustrate an application of the lock and traverse fine feed mechanism described above to an X-axis carriage.

The Y-axis carriage 144, which is described in detail in the above-identified copending application, includes a box beam 146 supported by spool bearings 148, 150 rolling on a way 151 fixed to a base 153, and a stabilizer spar 152 fixed thereto and guided by a roller 154 tracking on a precision ground guide tube 156.

The lock and traverse fine feed mechanism 158 includes a gripper linkage 160 (FIG. 10) which is comprised of a pair of levers 162 and 164 pivotally mounted at 166 to a bracket 168. The bracket 168 is bolted to the stabilizer spar 152, so as to be drivingly connected to the X-axis carriage.

An oblong in section brake bar 170 is disposed between the upper ends of the levers 162 and 164 rotatably supported on side plates 172 and 174 of the base 153, and drivingly connected to an extension rod 176 and control knob 177 via right angle drive 178.

A threaded control rod 180 is also rotatably supported on the side plates 172 and 174 disposed between the lower ends of levers 162 and 164. Internally threaded semicircular cutouts 182 and 184 complementary to the thread on the threaded control rod 180. An extension rod 186 and connected knob 187 are drivingly connected to the control rod via right angle drive 188.

A bias spring 190 is included to bias the upper ends of the levers 162 and 162 apart.

This mechanism 158 operates in the same manner as the mechanism described supra. Rotation of knob 177 causes the brake bar to rotate to the position shown in phantom in FIG. 10 against the bias of the spring 190 and causes a frictional braking of the X-axis carriage. At the same time the semicircular coutouts 182 and 184 are rotated into engagement with the threaded adjustment rod 180, securely holding the X-axis carriage against movement.

Rotation of knob 187 and the connected adjustment rod 180 will cause the advancement of the brake bar 170 and the gripper linkage 160.

This frictional braking insures elimination of backlash error due to play in the adjusting threads and associated linkage, firmly positioned the carriage in every selected position.

From the above description, it can be appreciated that a much simplified bearing and lock and traverse fine feed mechanism has been provided to create a lower cost measuring machine of the type described.

It should also be appreciated that many variations from the specific embodiments described without departing from the scope of the invention as defined in the appended claims.

What is claimed is:

1. A lock and traverse mechanism for locking one member with respect to another and adjusting their relative position along a path comprising:
   a gripper linkage mounted on one of said members, said gripper linkage including a pair of levers pivotally connected to each other at an intermediate point along their length so that opposite ends of said levers move in opposite directions upon rotation thereof about said pivotal connection;
   an adjusting rod threaded along its length and rotatably mounted on the other of said members and passing between said levers on one side of said pivotal connection;
   a bar member rotatably mounted on said other member extending between said levers on the other side of said connection;
   said gripper linkage levers having contours formed on said one side which in a position of said levers about said pivotal connection cooperate with said thread on said adjusting rod; and
   said bar member having an oblong cross-sectional contour such that rotation thereof causes engagement with said levers and causes said levers to move to said position gripping said adjustment rod.

2. The mechanism of claim 1 further including means retaining said levers and said bar member in frictional engagement in said position.

3. The mechanism of claim 1 further including spring bias means biasing said members out of said position.

* * * * *